(12) United States Patent
Hybinette et al.

(10) Patent No.: US 8,324,527 B2
(45) Date of Patent: Dec. 4, 2012

(54) HYBRID LASER ARC WELDING SYSTEM AND METHOD FOR RAILROAD TANK CAR FABRICATION

(75) Inventors: Carl S. Hybinette, Chicago, IL (US); Robert S. Toms, Naperville, IL (US)

(73) Assignee: Union Tank Car Company, Chicago, IL (US)

( * ) Notice: Subject to any disclaimer, the term of this patent is extended or adjusted under 35 U.S.C. 154(b) by 350 days.

(21) Appl. No.: 12/817,539

(22) Filed: Jun. 17, 2010

(65) Prior Publication Data

US 2010/0320174 A1  Dec. 23, 2010

Related U.S. Application Data

(60) Provisional application No. 61/187,725, filed on Jun. 17, 2009.

(51) Int. Cl.
*B23K 26/00* (2006.01)
*B23K 9/00* (2006.01)
*B23K 33/00* (2006.01)

(52) U.S. Cl. ............... 219/121.64; 219/121.63; 219/74; 219/121.12; 219/121.13; 219/121.78; 219/137 R (58) Field of Classification Search ............... 219/617, 219/59.1, 60 R, 61 A, 61.1, 61.3, 121.63, 219/121.64, 124.31, 130.1, 136, 137 R
See application file for complete search history.

(56) References Cited

U.S. PATENT DOCUMENTS

| 3,864,812 | A | | 2/1975 | Fiegel, Jr. et al. | |
|---|---|---|---|---|---|
| 4,081,651 | A | | 3/1978 | Randolph et al. | |
| 4,534,805 | A | | 8/1985 | Jesseman | |
| 4,664,307 | A | * | 5/1987 | Curry et al. | 228/145 |
| 5,155,330 | A | | 10/1992 | Fratiello et al. | |
| 6,875,942 | B2 | * | 4/2005 | Coughlin et al. | 219/62 |
| 6,884,975 | B2 | | 4/2005 | Matsen et al. | |
| 7,081,599 | B2 | | 7/2006 | Aebersold | |
| 2005/0121426 | A1 | * | 6/2005 | Wang et al. | 219/121.64 |
| 2006/0175315 | A1 | * | 8/2006 | Wang | 219/137 R |
| 2008/0128395 | A1 | | 6/2008 | Aigner et al. | |
| 2010/0078412 | A1 | * | 4/2010 | Diez et al. | 219/121.64 |

OTHER PUBLICATIONS

PCT International Search Report and Written Opinion of the International Searching Authority for International Application No. PCT/US2010/038983, Aug. 17, 2010.

* cited by examiner

*Primary Examiner* — Kiesha Bryant
*Assistant Examiner* — Dmitriy Yemelyanov
(74) *Attorney, Agent, or Firm* — R. Blake Johnston; DLA Piper LLP (US)

(57) ABSTRACT

A system for welding a tub of a railroad tank car includes a manipulator boom adapted to move with respect to the interior surface of the tank shell. A hybrid laser arc welding head mounted to the manipulator. A supplemental gas metal arc welding head includes dual wires of welding material and is mounted to the manipulator adjacent to the hybrid laser arc welding head. An inductive heating coil is mounted adjacent to the supplemental gas metal arc welding head. The hybrid laser arc welding head welds a seam of the railroad tank car shell with the supplemental gas metal arc welding head following to generally complete filling of a resulting weld joint with welding metal. The supplemental gas metal arc welding head is followed with the inductive heating coil to provide heat to normalize the resulting weld joint.

30 Claims, 6 Drawing Sheets

HYBRID LASER ARC WELDING SYSTEM AND METHOD FOR RAILROAD TANK CAR FABRICATION

CLAIM OF PRIORITY

This application claims priority from U.S. Provisional Patent Application Ser. No. 61/187,725, filed Jun. 17, 2009.

FIELD OF THE INVENTION

The present invention relates to railroad tank cars and, more particularly, to a system and method for the construction of tank shells for railroad tank cars.

BACKGROUND

The transportation of liquid commodities by rail, specifically by tank cars, is a vitally important portion of all of the North American economies. While all tank cars are capable of some degree of pressure retention, certain types are specifically designated as "pressure" cars. These cars are designed for the transportation of liquefied gasses, such as liquid propane gas (LPG), anhydrous ammonia, and chlorine, among many others and are subject to stringent control with regard to design, inspection, qualification, and operation of the vehicle. Furthermore, many of the commodities transported in tank cars are classified as hazardous by the Federal Railroad Administration (FRA). Any car, pressure or non-pressure, which transports hazardous commodities, must comply with the Department of Transportation (DOT) specification approved for that commodity.

The Association of American Railroads (AAR) augments the FRA rules with additional requirements for certain commodities as well as tank cars in general. For example, while the DOT federal regulations specify the materials of construction for tank cars, they do not require that the steels used for the construction of pressure cars be normalized. The AAR, however, has set forth its own requirements in addition to those of the DOT, that such steels be in the normalized condition. The purpose of these additional requirements is to enhance the ability of the tank cars to resist fracture when loaded beyond normal conditions encountered in the course of transportation, such as in accidents.

As the quantity of hazardous materials shipped by rail increases over time, there is ever greater attention paid, and regulations directed, to the improvement of the ability of tank cars to resist fracture in accident situations. Both the design of the tank car and the materials of construction have been subject to review. The general direction of improvements has been towards thicker materials and welds having an enhanced ability to resist brittle fracture, that is, increased toughness.

The prior art welding of tank car tanks consists of single or multiple wire submerged arc welding (SAW) processes. The SAW process consists of a weld wire through which the welding current is passed, causing the formation of the welding arc and melting of the wire to make the weld deposit. A granular flux is deposited over the welding arc, causing the arc to be submerged beneath. This process has a heat input, measured in Joules/inch, that is sufficiently high to obtain both good penetration into the base metal and high deposition rates. The high heat input, however, can be deleterious to the toughness of the weld deposit, and in spite of the high deposition rate, is slow. In addition, a great deal of heat input (energy) is wasted due to the melting of large volumes of base plate material not necessary for the formation of the weld.

Welding thicker sections and providing lower heat inputs (for greater toughness) requires multiple passes when using the SAW process, since less welding metal is deposited per pass. As a result, more passes are required to fill the joint with welding metal. This causes the tank car building times and costs to increase substantially due to higher labor costs. The necessity of cleaning fused flux between passes increases cost and time even more.

The hybrid laser arc welding (HLAW) process has been under development for some time, but has yet to find use in heavy plate welding requiring circular girth seams as is found in railroad tank cars. Furthermore, the application of HLAW for railroad tank cars has some additional special requirements not found in other industries: 1) tank cars are constructed of individual shell courses, each approximately ten feet wide, which are rolled into shell sections which vary from ninety inches inside diameter to as much as one hundred and nineteen inches in diameter; 2) the thickness of tank cars varies from seven-sixteenths of an inch to one inch or more; 3) some tank cars, including those carrying liquefied gasses under pressure, are required to meet stringent toughness requirements for the welds and heat affected zones (these requirements are expected to be extended to most non-pressure cars in the near future); 4) the individual shell courses are butted together to make girth seams which must be welded in the roundabout position and 5) there are potential changes to the regulations being considered by the Association of American Railroads and the Department of Transportation which, if enacted, would expand the new car construction requirement for shell and weld toughness to most, and probably all, DOT class tank cars.

Therefore, a need exists for a system and method for welding tank car tanks that has the capability to weld all thicknesses in a single pass, is simple to switch from one thickness to another, and yet has a low heat input for meeting the toughness requirements for tank car construction.

DETAILED DESCRIPTION OF EMBODIMENTS

Figure 1:
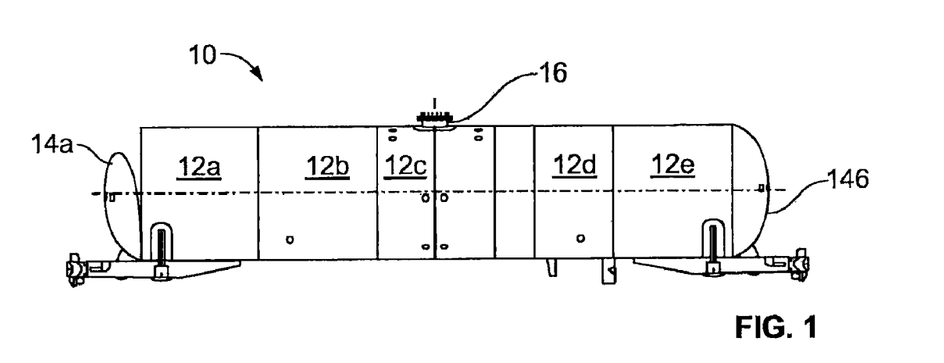
FIG. 1 is a side elevational view of a tank shell of a tank car constructed using an embodiment of the hybrid laser arc welding system and method of the present invention.

A tank shell or simply tank of a tank car constructed in accordance with an embodiment of the hybrid laser arc welding system and method of the invention is indicated in general at 10 in FIG. 1. The tank in the illustration consists of five shell courses 12a-12e, each welded to the next in line, as explained in greater detail below, and two formed heads 14a and 14b, one at each end of the tank. As illustrated in FIG. 1, a manway nozzle 16 is positioned at the top center of the tank, while various brackets 18a and 18b, and the draft sill and coupler assemblies 22a and 22b are located on the bottom of the tank with the draft sill and coupler assemblies positioned at each end of the tank. These structures are illustrated for orientation purposes only and do not limit the scope of the invention. In addition, while five shell courses 12a-12e are illustrated in FIG. 1, it is to be understood that the tank 10, and any of the tubs described below, could be constructed with an alternative number of shell courses.

Figure 2:
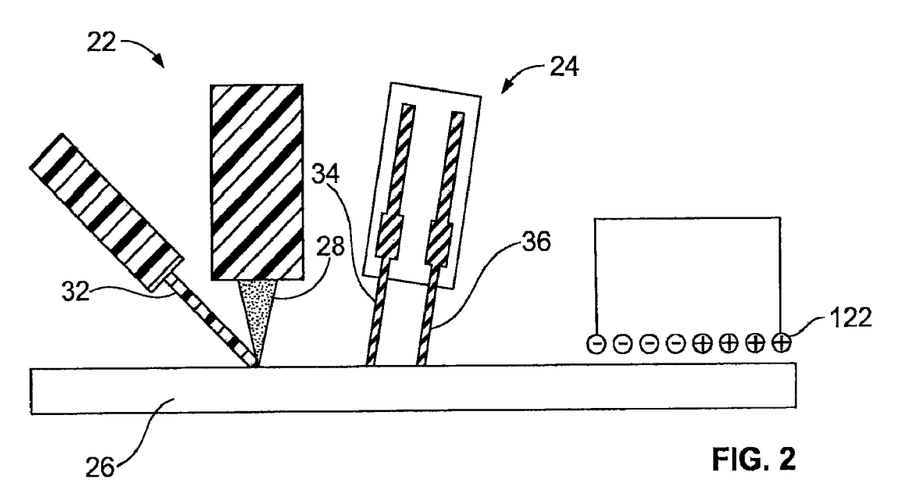
FIG. 2 is a simplified schematic view of a hybrid laser arc welding head, a dual wire gas metal arc welding head and an inductive heating system in an embodiment of the hybrid laser arc welding system and method of the present invention.

The shell courses of the tank of FIG. 1 are joined together using an embodiment of the hybrid laser arc welding system and method of the invention. With reference to FIG. 2, an embodiment of the system features both a hybrid laser arc welding (HLAW) head, indicated in general at 22, and a supplemental dual wire gas metal arc welding (GMAW) head, indicated in general at 24. A cross sectional view of the portion of the wall of the tank shell being welded is indicated at 26. As illustrated in FIG. 2, the HLAW head includes a laser 28 and a GMAW wire 32 constructed from welding metal. As the name implies, the dual wire GMAW head includes first and second GMAW wires 34 and 36, also constructed from welding metal. GMAW wires 32, 34 and 36 may be, for example, AWS E70S-3 and/or E70S-6 wire.

Figure 3:
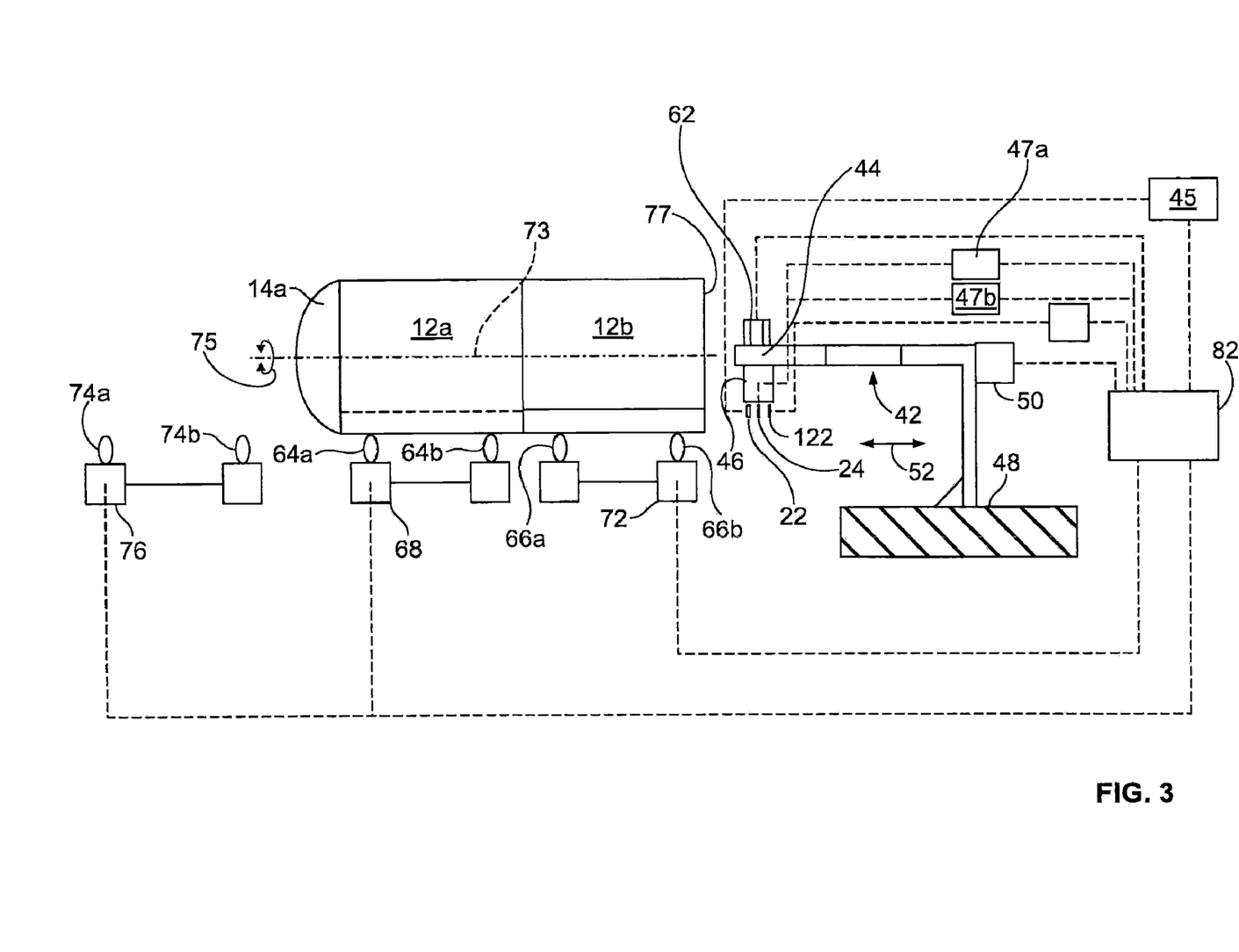
FIG. 3 is a simplified schematic view of an embodiment of the hybrid laser arc welding system of the present invention and a tank shell tub being welded.

As illustrated in FIG. 3, the HLAW head 22 and the dual wire GMAW head 24 are mounted to a manipulator, such as a manipulator boom, indicated in general at 42, at distal portion 44 via a main turntable 46 that rotates with respect to the boom distal portion. The HLAW head 22 receives power from a power source 45 while the dual wire GMAW head 24 receives power from power sources 47a and 47b. While a manipulator boom 42 is shown in FIG. 3, the manipulator may take other forms such as a rack or bracket mounted on tracks or another structure or any other device the allows a work piece to be moved with respect to the welding heads.

The manipulator boom 42 is mounted to a base 48 and is preferably telescopic under the control of electric telescoping motor 50 so that the distal portion 44 may be moved horizontally, as indicated by arrows 52. Alternative arrangements known in the art for horizontally moving the manipulator boom including, as an example only, a boom that slides on a vertical support, may be employed in place of the telescopic mechanism.

Figure 4A:
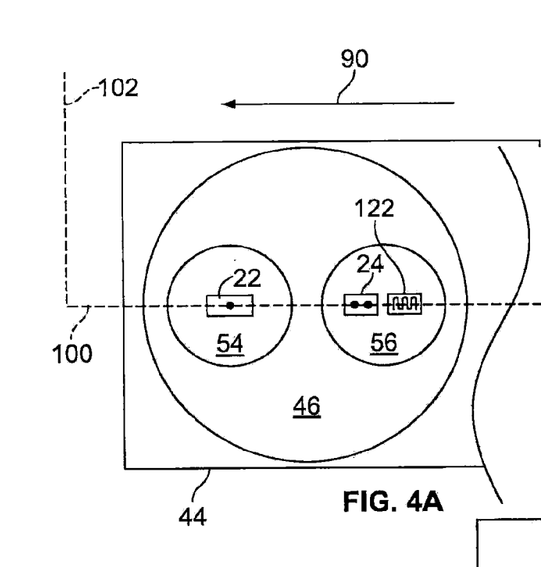
FIGS. 4A-4C are enlarged simplified schematic top views of the head portion of the manipulator boom and main turntable of FIG. 3 and the hybrid laser arc welding head, the dual wire gas metal arc welding head and the inductive heating system of FIGS. 2 and 3 illustrating movement of the head portion of the manipulator boom and turntables to which the welding heads and inductive heating system are mounted as they perform the initial welding sequence of FIG. 7A.

As illustrated in FIG. 4A, the HLAW head 22 and dual wire GMAC head 24 are mounted to main turntable 46 via a leading turntable 54 and a trailing turntable 56, respectively. As a result, the HLAW head 22 and dual wire GMAC head 24 may be pivoted independently of one another via turntables 54 and 56 as well as simultaneously pivoted together via main turntable 46. Actuation of the main turntable 46 and the leading and trailing turntables 54 and 56 is achieved via the three turntable motors 62 (one for each turntable) of FIG. 3.

Figure 5:
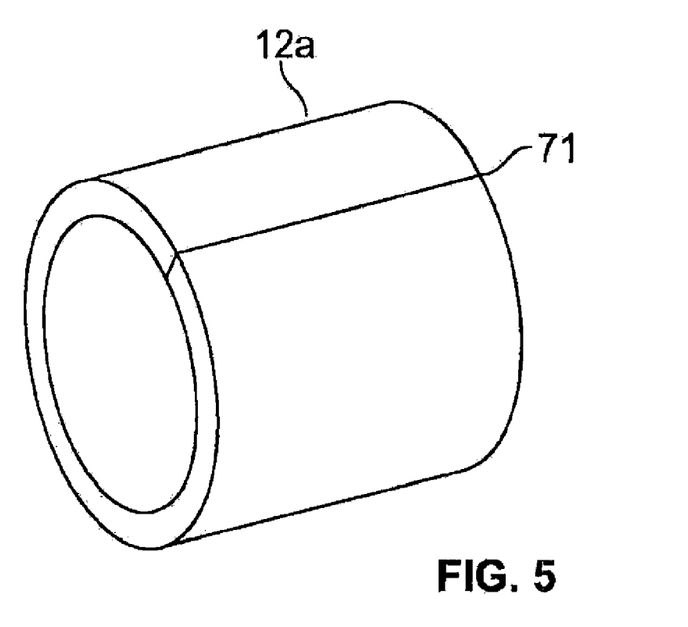
FIG. 5 is a perspective view of a tank shell course prior to being welded.

As further illustrated in FIG. 3, tank shell course 12a is supported on rollers 64a and 64b while tank course 12b is supported on rollers 66a and 66b. As illustrated in FIG. 5, tank shell course 12a is constructed from a plate of steel that is rolled into a cylinder so that a longitudinal seam 71 is formed. Course 12b features a similar construction. Processes and systems for forming such courses are well known in the art.

Rollers 64a, 64b and 66a, 66b are powered by electric roller motors 68 and 72. When activated, the roller motors and rollers rotate the tank courses 12a and 12b about longitudinal axis 73 (illustrated in phantom in FIG. 3), as indicated by arrows 75. As a result, the courses may be simultaneously rotated for welding as described below. Supplemental rollers 74a and 74b, which are powered by roller motor 76, are provided for tubs featuring three shell courses.

As described in greater detail below, the distal portion 44 of the manipulator boom 42 extends into the open end 77 of the tub with the welding heads facing generally downward as welding progresses. As a result, the tub is welded along its interior surface. The welding head power sources 45, 47a and 47b, manipulator boom telescoping motor 50, turntable motors 62 and roller motors 68, 72 and 76 are all connected to a computerized, programmable controller 82 that controls the simultaneous operation of each component so that the welding sequence described below may be performed. It should be noted that, while the embodiment discussed herein welds the tub along it interior surface, the system and method of the invention could alternatively be used to weld along an exterior surface of a tub, shell course or other structure.

Figure 6:
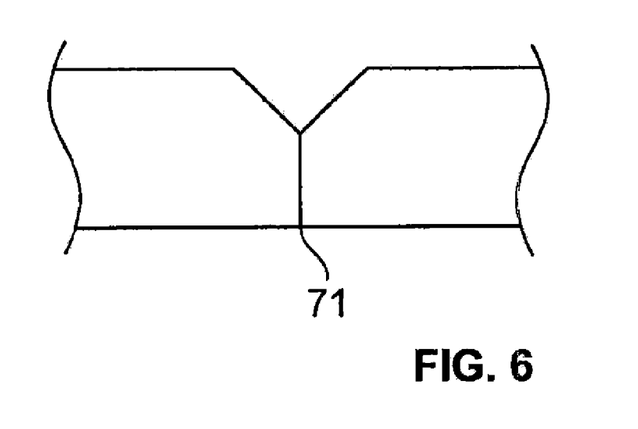
FIG. 6 is an enlarged cross sectional view of the unwelded longitudinal seam of the tank shell course of FIG. 5 in an embodiment where the abutting ends have been beveled due to plate thickness.

In the illustrated embodiment of the system and method of the present invention, the HLAW head 22 welds the full thickness of the tank shell seams when the thickness of the plate is approximately ¾" or less. When the plate (seam) thickness exceeds the maximum thickness weldable with the HLAW process alone, the plate is beveled on one side only to a depth of approximately ¼", as illustrated in FIG. 6 for seam 71 of FIG. 5. The GMAW dual wire head 24 follows the HLAW welding head 22 at a close distance, preferably approximately two inches, providing complete weld joint fill in one pass.

More specifically, with reference to FIG. 2, the HLAW head's high power laser 28 and GMAW wire 32 operate together in the same weld pool. The laser portion of the HLAW head 22 provides rapid and deep penetration of the plate, while the GMAW portion of the HLAW head provides a small amount of filler weld metal to allow for small joint gaps or other conditions for which an addition of weld metal is needed to produce a weld that is at least flush with the surface of the plate.

The laser beam from the HLAW head laser provides the deep joint penetration by the formation of a "keyhole", or plasma filled void. For welding metallic objects, the laser beam is focused to obtain intensities of more than 1 MW/cm$^2$. When the laser beam hits the surface of the material, this spot is heated up to vaporization temperature, and a vapor cavity is formed in the weld metal due to the escaping metal vapor. The extraordinary feature of the weld seam is its high depth-to-width ratio. Unlike a dual process where two separate weld processes act in succession, HLAW head 22 provides a combination of both weld processes acting simultaneously in one and the same process zone. The combination of the laser and arc processes results in a synergistic increase in both weld penetration depth and welding speed.

For a welding travel speed of 100 inches per minute and the corresponding heat input required, the HLAW head 22 (FIGS. 2-4C), is not capable of maintaining complete weld joint fill if gaps or bevel angles from the cutting process are excessive, or thicker tanks are constructed. In this case, it is necessary to deposit additional weld metal in the weld joint concurrent with the HLAW process itself so as not to require an additional weld pass. This requires use of the twin or dual wire GMAW head 24 (FIGS. 2-4C) which, due to the dual wire construction, has the capability of depositing weld metal at the same travel speed as the HLAW head. A single wire system does not provide sufficient weld metal to properly solidify into a smooth and continuous weld bead at the welding speeds due to surface tension effects that result in a phenomenon known as "humping" in which the deposited weld metal solidifies in an inconsistent manner with an erratic bead profile. In addition to the capability to produce welds at the high welding speeds of HLAW, the use of a dual wire system provides more filler metal than the single arc system, enabling the process to fill the small groove in one pass. The dual wire GMAW head 24 and process uses a pulsed current from two power sources 47*a* and 47*b* (FIG. 3) in order to obtain its high speed and to resist electrical interference between the two wires. As such, it is not simply a process utilizing two welding wires traveling through a common contact tip. The two contact tips of the dual wire GMAW head are independently controlled by power sources 47*a* and 47*b* of FIG. 3. For applications where a slower welding speed is used, a single wire GMAW head may be substituted for dual wire GMAW head 24.

The current to the heads will vary depending on the thickness of the material being welded and the depth of the groove to fill. As an example only, a median estimate for HLAW head 22 is in the range of 250 to 300 amps, and dual wire. GMAW head 24 is in the range of 400 to 500 amperes. At arc voltages of 34 and 39 volts, the power for the GMAW heads would be estimated at 10 kW for the single arc (HLAW head 22), and 20 kW for the tandem arc (dual wire GMAW head 24). Compared to the laser power of 15 kW, the ratios are 66% and 133%, respectively. The laser power is much more concentrated than the GMAW, therefore the power is less to obtain the penetration required, kW for kW.

The GMAW heads are capable of travel speeds of up to 100 ipm (inches per minute), however, the optimal speed may be 80 to 90 ipm, due to humping (surface tension) effects in the deposited weld metal. The range of possible travel speeds vary based on conditions such as different material thicknesses, bevel conditions depending on thickness and the effect of joint gaps. The dual wire GMAW head 24 is the only GMAW-based process currently available that can match the travel speeds of the HLAW process, up to the above-noted speeds.

Figure 7A:
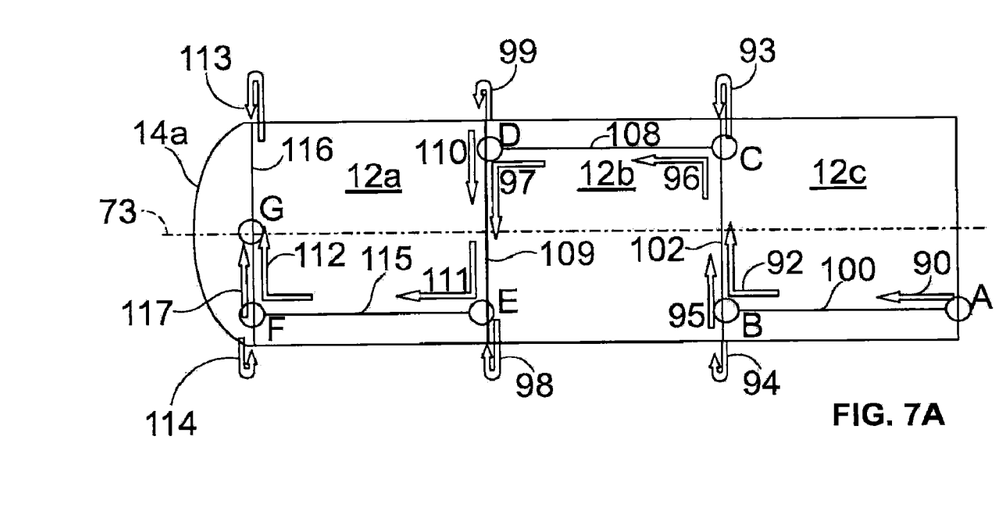
FIGS. 7A and 7B are a top plan view and an end elevational view, respectively, of a tub portion of the tank of FIG. 1 illustrating the sequence of welding in accordance with an embodiment of the hybrid laser arc welding system and method of the invention.
Figure 7B:
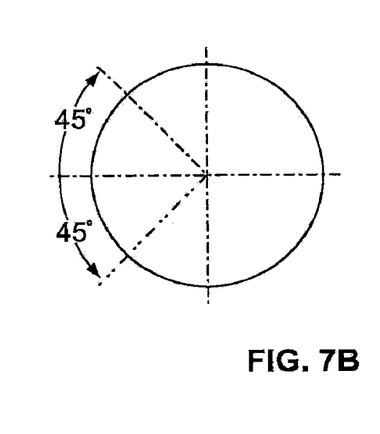

The sequence of welding for an exemplary tank section or tub consisting of an end cap or head 14*a*, and three shell courses 12*a*-12*c* using the system of FIGS. 2-4C in accordance with an embodiment of the method of the invention is illustrated in FIGS. 7A and 7B. In the example presented in FIGS. 7A and 7B, there are a total of three longitudinal seams and three girth seams. FIG. 7A provides a top plan view of the tub, while FIG. 7B provides an end elevational view of the tub.

With reference to FIG. 7A, the welding commences at point A and the distal portion of the manipulator boom traveling (via the telescopic action of the manipulator boom) in the direction of arrow 90 along weld seam 100 to point B with the HLAW head operating at full power. For thick sections that are beveled on the welded side (as illustrated in FIG. 6), the dual wire GMAW process commences welding when that welding head reaches point A, that is, after the HLAW head has traveled approximately 2 inches. As a result, both the HLAW and GMAW welding heads operate concurrently, eliminating the need for successive passes for complete joint fill. An enlarged schematic top view showing the positions of the distal portion 44 of the manipulator boom, turntables 46, 54 and 56 and HLAW head 22 and dual wire GMAW head 24 at this stage is provided in FIG. 4A.

Figure 4B:
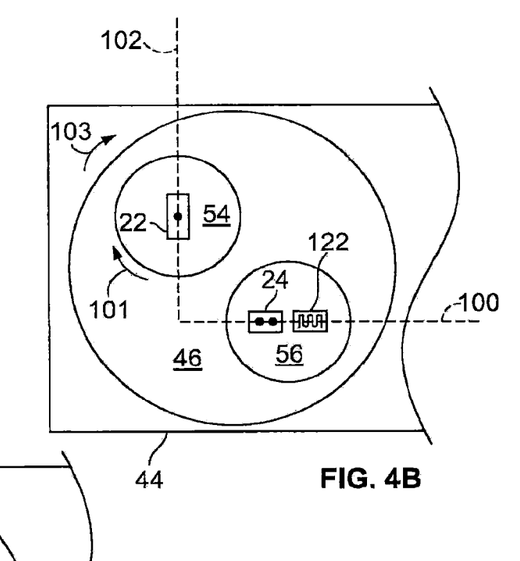
Figure 4C:
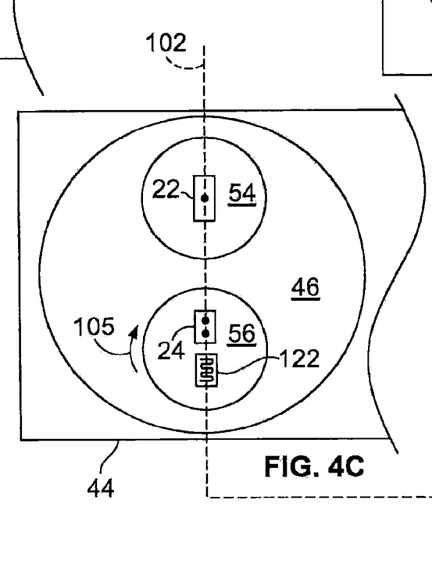

At point B in FIG. 7A, the HLAW welding head, which is mounted on the leading turntable (54 in FIGS. 4A-4C), turns 90 degrees, as indicated by arrow 101 in FIG. 4B. This enables the HLAW head to perform welding along seam 102. As illustrated in FIG. 4B, the main turntable 46 pivots in the direction of arrow 103 as the HLAW head 22 progresses along seam 102. This permits the dual wire GMAW head 24 to continue welding in the original direction for the last two inches until the end of the weld seam 100 at point B is reached, at which time it swivels, via trailing turntable 56, in the direction of arrow 105 of FIG. 4C to follow the HLAW head 22 along seam 102. As a result, the welding heads make the change in welding direction illustrated by arrow 92 in FIG. 7A. The rollers (64*a*, 64*b*, 66*a*, 66*b*, 74*a* and 74*h* of FIG. 3) rotate the tub about longitudinal axis 73 of FIGS. 3 and 7A to cause the welding heads to move along the seam 102. An enlarged schematic top view showing the positions of the distal portion 44 of the manipulator boom, turntables 46, 54 and 56 and HLAW head 22 and dual wire GMAW head 24 after completing the turn is provided in FIG. 4C.

Between points B and C, the HLAW head is powered down to apply a partial penetration weld only, and the dual wire GMAW head is turned off altogether. This operation takes place to allow for subsequent welding at full power to complete the girth weld along seam 102. At point C in FIG. 7A, the power of the HLAW head is returned to full power and the dual wire GMAW head is restarted, if necessary (i.e. in the event of thick, beveled tub walls). As indicated by arrows 93, 94 and 95 in FIG. 7A, the full circumference of the girth weld is made, with the welding head returning to point C as the tub rotates 360 degrees about longitudinal axis 73 of FIGS. 3 and 7A on rollers 64*a*, 64*b*, 66*a*, 66*b*, 74*a* and 74*b* of FIG. 3. At this time, as illustrated by arrow 96 in FIG. 7A, the turntables of the distal portion of the manipulator boom sequentially turn the HLAW and dual GMAW welding heads 90 degrees, in a manner similar to the one illustrated in FIGS. 4A-4C, to make the next longitudinal weld along seam 108 between points C and D of FIG. 7A with both the HLAW and dual wire GMAW welding heads operating at full power (assuming from here on that the tub features a thick-walled construction with beveled seams).

After making the turn indicated by arrow 97 in FIG. 7A, between points D and E, the HLAW head is powered down to initially apply a partial penetration weld only along seam 109, and the dual wire GMAW head is turned off altogether. At point E in FIG. 7A, the power of the HLAW head is returned to full power and the dual wire GMAW head is restarted. As indicated by arrows 98, 99 and 110 in FIG. 7A, the full circumference of the girth weld is made along seam 109, with the welding head returning to point E as the tub rotates 360 degrees about longitudinal axis 73 of FIGS. 3 and 7A on rollers 64*a*, 64*b*, 66*a*, 66*b*, 74*a* and 74*b* of FIG. 3. At this time, as illustrated by arrow 111 in FIG. 7A, the turntables of the distal portion of the manipulator boom sequentially turn the HLAW and dual GMAW welding heads 90 degrees, in a manner similar to the one illustrated in FIGS. 4A-4C, to make the next longitudinal weld along seam 115 between points E and F of FIG. 7A with both the HLAW and dual wire GMAW welding heads operating at full power.

After making the turn indicated by arrow 112 in FIG. 7A, between points F and G, the HLAW head is powered down to initially apply a partial penetration weld only along seam 116, and the dual wire GMAW head is turned off altogether. At point G in FIG. 7A, the power of the HLAW head is returned to full power and the dual wire GMAW head is restarted. As indicated by arrows 113, 114 and 117 in FIG. 7A, the full circumference of the girth weld is made along seam 116, with the welding head returning to point G as the tub rotates 360 degrees about longitudinal axis 73 of FIGS. 3 and 7A on rollers 64a, 64b, 66a, 66b, 74a and 74b of FIG. 3. At this time, the shell section's welds have been complete and the tub is completely welded.

It should be noted that, while theoretically unnecessary, given the variation that inevitably occurs in production as equipment wears in, etc, it may be desirable to have vertical adjustment capability for both HLAW head 22 and dual wire GMAW head 24. Also, the electrical stick-out may need to vary depending on the speeds and currents for a particular tank design, so again, adjustment would be necessary.

The tank car bodies are constructed in two sections called tubs that are later joined together with a girth weld to form the tank shell of FIG. 1.

It should be noted that as the HLAW welding head approaches the points at which the direction of welding changes, that is the ends of the longitudinal and girth seams, both the travel speed of welding and laser power decrease in order to decelerate slightly and change direction smoothly. Without a deceleration, the momentum of the manipulator arm would cause an abrupt impulse to the equipment which could adversely affect the weld process. Furthermore, it should be noted that a sliding arrangement, or other alternative arrangement for moving the welding heads, may be substituted for the main turntable 46 of FIGS. 3 and 4A-4C.

As noted previously, the controller 82 of FIG. 3 operates and coordinates the operation of the welding head power sources 45, 47a and 47b, manipulator boom telescoping motor 50, turntable motors 62 and roller motors 68, 72 and 76 so that the above operations and the welding sequence of FIGS. 4A-4C, 7A and 7C may be performed.

Figure 8:
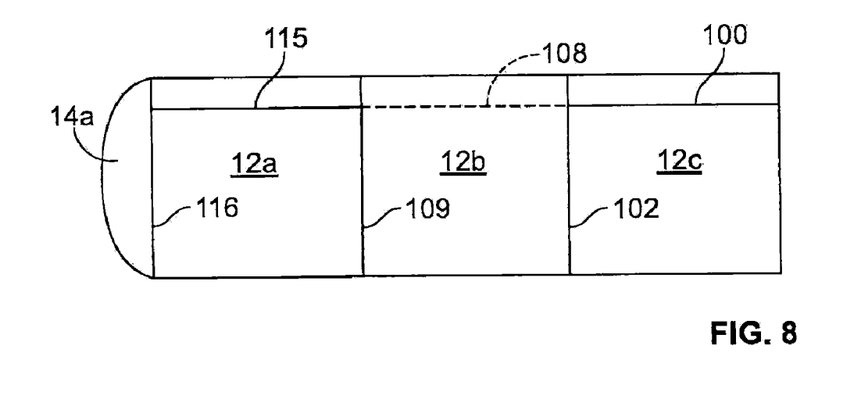
FIG. 8 is a side elevational view of the tub of FIGS. 7A and 7B as it would be oriented on a completed tank car tank.

As illustrated in FIGS. 7B and 8, the longitudinal seams 100, 108 and 115 of FIG. 7A are oriented alternatively at 45 degrees right and left of top dead center, with the seam 108 on the far side of the tub illustrated in phantom.

Figures 9, 10:
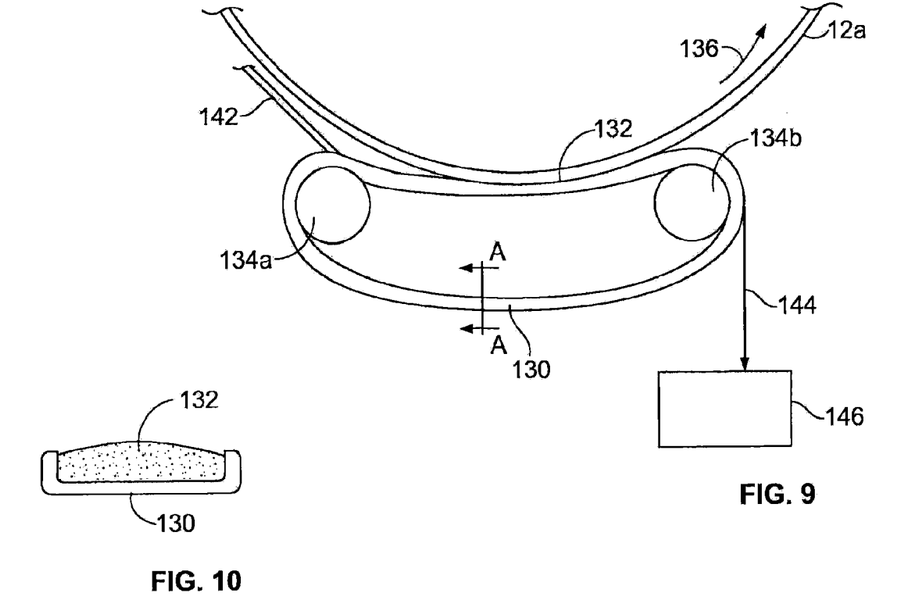
FIG. 9 is a schematic of a longitudinal seam flux bed.
FIG. 10 is a cross sectional view of the belt of FIG. 9 taken along line A-A of FIG. 9.

The welds are made from the interior side of the tub only, with the weld seams preferably backed up by a flux bed to protect the back side of the weld from excessive burn through and excessive oxidation. With reference to FIGS. 9 and 10, the flux bed takes the form of a moving flux belt for the girth, or circumferential. weld seams. More specifically, as illustrated in FIGS. 9 and 10 for the girth weld seem between courses 12a and 12b, a tray-shaped belt 130 holds flux 132. The belt contacts exterior surfaces of courses 12a and 12b and is mounted on free-wheeling rollers 134a and 134b so that the belt moves along with the courses 12a and 12b as they rotate in the direction of arrow 136. The rollers may optionally be powered. Flux 132 is dispensed from a flux supply source, such as a hopper, onto the belt 130 through a pipe or chute 142. As illustrated by arrow 144, the flux is collected in collection hopper 146 after use.

Figure 11:
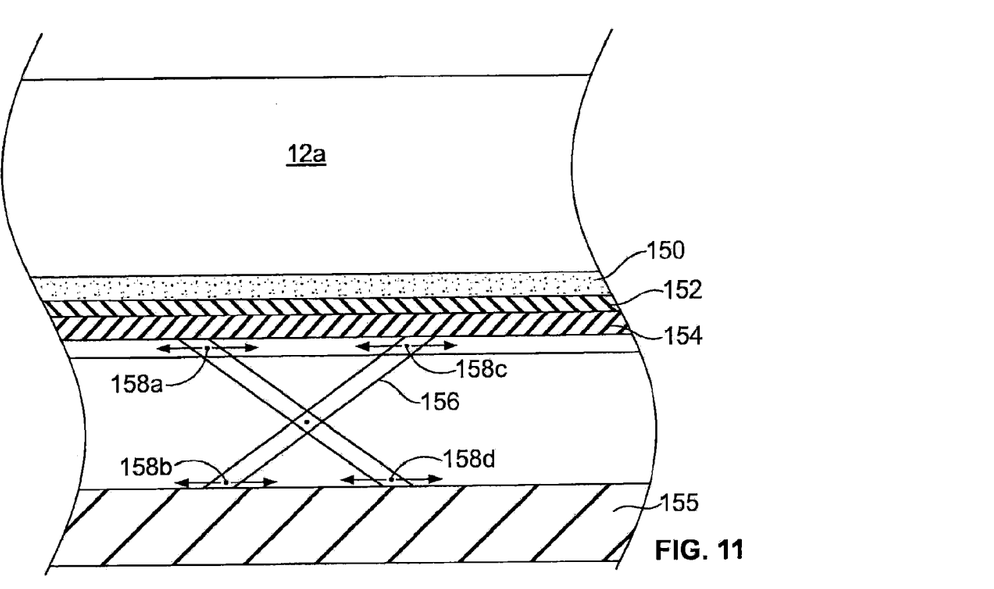
FIG. 11 is a schematic of a girth seam flux bed.

With reference to FIG. 11, the flux beds take the form of a long tray with an inflatable support for the longitudinal seams. More specifically, as shown for weld seam 71 (see also FIG. 5) for course 12a, a flux bed 150 is supported by rubber support bed 152. An inflatable base 154 maintains contact between the flux bed 150 and the course 12a. These components are supported on floor 155 by a scissor support structure 156, which may be used to raise and lower the flux bed. Pinned locations 158a-158d of the scissor support provides the necessary slider movement for such functionality.

Preferably, the material for construction of the tank car shell used in the system and method described above is a microalloy steel capable of greater toughness at low temperatures than more conventional steels. For example, the steel may be a chemically modified version of ASTM A710 grade steel that is a copper precipitation strengthened steel with low carbon content. The welding of such steel using the system and method described above provides the low heat input that allows the toughness of the completed weld to likewise exhibit high toughness. The combination of such steel and the system and method described above thus provides a tank car with enhance ability to withstand many accident scenarios that could otherwise result in release of the lading. Other steels that derive their strength and toughness through copper precipitation hardening and the addition of other microalloying elements could also preferably be used.

When such steels are welded, the as welded toughness of the weld metal is very high, but when post weld heat treated (stress relieved), the weld metal toughness is severely affected. More specifically, for tank cars constructed of both modified and non-modified ASTM A710 materials, the weld metal may become embrittled during the stress relief heat treatment following welding. While a means of restoring the toughness of the weld metal is to normalize the weld by reheating to 1650° F., such a treatment, if applied to the entire car would result in unacceptable warping of the entire tank shell. The system of FIGS. 2-4C solves this metallurgical problem by locally normalizing the weld zone using high frequency inductive heating coils, illustrated at 122 in FIG. 3, that travel with the welding process. As illustrated in FIGS. 3 and 4A-4C, the inductive heating coils 122 are preferably attached to the trailing turntable 56 so as to travel with the dual wire GMAW head 24. The inductive coils 122 normalize a portion of the weld joint concurrently with the welding operation itself. As a result, the system provides a method to prevent embrittlement during post weld heat treatment. As illustrated in FIG. 3, the inductive heating coils 122 receive power from power supply 124, which is controlled by the programmable system controller 82. The heating coils preferably heat the weld joint to a temperature of approximately 1575° F. to 1700° F., with a preferable target temperature of 1650° F.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for welding a tub of a railroad tank car comprising:
   a) a manipulator adapted to move with respect to a surface of the tub;
   b) a hybrid laser arc welding head mounted to the manipulator;
   c) a supplemental gas metal arc welding head including a first wire of welding material, said supplemental gas metal arc welding head mounted to the manipulator adjacent to the hybrid laser arc welding head; and
   d) said hybrid laser arc welding head adapted to weld a seam of the railroad tank car tub with said supplemental gas metal arc welding head following the hybrid laser arc welding head to generally complete filling of a resulting weld joint with welding metal.

2. The system of claim 1 wherein the supplemental gas metal arc welding head includes a second wire of the welding metal.

3. The system of claim 1 wherein the manipulator is adapted to move with respect to an interior surface of the tub.

4. The system of claim 1 further comprising a first set of rollers and an adjacent second set of rollers, said first set of rollers adapted to hold a first course of the tub and said second set of rollers adapted to hold a second course of the tub so that the first and second courses may be rotated about a common longitudinal axis and welded together by the hybrid laser arc welding head and the supplemental gas metal arc welding head.

5. The system of claim 4 further comprising a first roller motor operatively connected to the first set of rollers and a second roller motor operatively connected to the second set of rollers and a computerized controller in communication with and controlling the manipulator and the first and second roller motors.

6. The system of claim 5 further comprising a hybrid laser arc welding head power source and a supplemental gas metal arc welding head power source, said computerized controller also in communication with and controlling the hybrid laser arc welding head and the supplemental gas metal arc welding head power sources.

7. The system of claim 1 further comprising a main turntable mounted to the manipulator with said hybrid laser arc welding head and the supplemental gas metal arc welding head mounted to said main turntable.

8. The system of claim 7 further comprising a leading turntable and a trailing turntable, both pivotally mounted to the main turntable, with said hybrid laser arc welding head mounted to the leading turntable and said supplemental gas metal arc welding head mounted to the trailing turntable.

9. The system of claim 8 further comprising a main turntable motor operatively connected to the main turntable, a leading turntable motor operatively connected to the leading turntable, a trailing turntable motor operatively connected to the trailing turntable and a computerized controller in communication with and controlling the main, leading and trailing turntable motors.

10. The system of claim 9 wherein the manipulator includes a manipulator boom with a distal portion to which the main turntable is pivotally mounted.

11. The system of claim 10 wherein the manipulator boom is telescopic and further comprising a boom telescoping motor that is in communication with and controlled by the computerized controller.

12. The system of claim 1 wherein the manipulator includes a manipulator boom including a distal portion to which the hybrid laser arc welding head and the supplemental gas metal arc welding head are mounted.

13. The system of claim 12 wherein the manipulator boom is telescopic.

14. The system of claim 12 further comprising a main turntable pivotally mounted to the distal portion of the manipulator boom with said hybrid laser arc welding head and the supplemental gas metal arc welding head mounted to said main turntable.

15. The system of claim 1 further comprising inductive heating coils mounted to the manipulator adjacent to said supplemental gas metal laser arc welding head, said inductive heating coils adapted to provide heat to normalize said resulting weld joint.

16. The system of claim 15 further comprising a main turntable pivotally mounted to the manipulator with said hybrid laser arc welding head, said supplemental gas metal arc welding head and said inductive heating coils mounted to said main turntable.

17. The system of claim 16 further comprising a leading turntable and a trailing turntable, both pivotally mounted to the main turntable, with said hybrid laser arc welding head mounted to the leading turntable and said supplemental gas metal arc welding head and said inductive heating coils mounted to the trailing turntable.

18. The system of claim 15 further comprising a hybrid laser arc welding head power source, a supplemental gas metal arc welding head power source, an inductive heating coils power source and a computerized controller, said computerized controller in communication with and controlling the hybrid laser arc welding head, the supplemental gas metal arc welding head and the inductive heating coil power sources.

19. A method for welding longitudinal and girth seams in a tub of a railroad tank car comprising the steps of:
  a) providing a hybrid laser arc welding head and a supplemental gas metal arc welding head including a first wire of welding material, said hybrid laser arc welding head and said supplemental gas metal arc welding head mounted to a manipulator adjacent to one another; and
  b) moving the manipulator parallel to a longitudinal axis of the tub along a longitudinal seam;
  c) welding the longitudinal seam of the railroad tank car with the hybrid laser arc welding head;
  d) following the hybrid laser arc welding head with the supplemental gas metal arc welding head to generally complete filling of a resulting longitudinal weld joint with welding metal;
  e) rotating the hybrid laser arc welding head through an angle of approximately 90 degrees with respect to the longitudinal seam;
  f) rotating the tub about the longitudinal axis so that the hybrid laser arc welding head is moved along a girth seam;
  g) welding the girth seam of the railroad tank car with the hybrid laser arc welding head;
  h) rotating the supplemental gas metal arc welding head through an angle of approximately 90 degrees with respect to the longitudinal seam; and
  i) following the hybrid laser arc welding head with the supplemental gas metal arc welding head to generally complete filling of a resulting girth weld joint with welding metal.

20. The method of claim 19 further comprising the steps of:
  j) providing an inductive heating coil mounted to the manipulator adjacent to the supplemental gas arc welding head;
  k) following the supplemental gas arc welding head with the inductive heating coil to provide heat to normalize the resulting longitudinal and girth weld joints.

21. The method of claim 19 wherein the tub is constructed from microalloy steel.

22. The method of claim 21 wherein the microalloy steel is ASTM A710 steel.

23. The method of claim 22 wherein the ASTM A710 steel is chemically modified.

24. The method of claim 23 wherein the ASTM A710 is a copper precipitation strengthened steel.

25. The method of claim 19 wherein the longitudinal seams are formed alternatively at approximately 45 degree angles right and left of top dead center.

26. The method of claim 19 wherein the supplemental gas metal arc welding head includes a second wire of welding material.

27. The method of claim 19 wherein the welding is performed from one side of longitudinal and girth seams only.

28. The method of claim 27 wherein the welding is performed on the interior surface of the tub.

29. The method of claim 19 wherein the tub is constructed from a plurality of abutting shell courses.

30. The method of claim 29 wherein step f) is accomplished by rollers supporting the abutting shell courses.

* * * * *